United States Patent [19]

Mak

[11] Patent Number: 4,658,238
[45] Date of Patent: Apr. 14, 1987

[54] METHOD AND APPARATUS FOR PROVIDING SELECTIVELY VARIABLE MODULATION SIGNAL FOR A CARRIER WAVE

[75] Inventor: Sioe T. Mak, St. Louis County, Mo.

[73] Assignee: Emerson Electric Co., St. Louis, Mo.

[21] Appl. No.: 411,035

[22] Filed: Aug. 24, 1982

[51] Int. Cl.$^4$ .......................................... H04M 11/04
[52] U.S. Cl. ............................ 340/310 R; 340/310 A; 307/3
[58] Field of Search ....................... 340/310 A, 310 R; 307/3; 455/39; 332/16 R, 17, 18

[56] References Cited

U.S. PATENT DOCUMENTS

| 2,647,253 | 7/1953 | Mackenzie | 340/310 R |
|---|---|---|---|
| 2,853,680 | 9/1958 | Nut | 332/16 |
| 3,488,517 | 1/1970 | Cowan et al. | |
| 4,106,007 | 8/1978 | Johnston | 340/310 R |
| 4,194,128 | 3/1980 | Biglin | 340/310 R |
| 4,218,655 | 8/1980 | Johnston | 340/310 A |
| 4,254,403 | 3/1981 | Perez-Cavero | 340/310 R |
| 4,370,563 | 1/1983 | Vandling | 340/310 A |
| 4,371,867 | 2/1983 | Gander | 340/310 R |
| 4,423,477 | 12/1983 | Gurr | 340/310 R |

OTHER PUBLICATIONS

*Electrical Review*, Nov. 18, 1977, "Cyclocontrol Could Modify Daily Load Demand".

*Public Lighting*, Mar. 1977, "A New Electricity Control System".

J. Robert Eaton, *Electric Power Transmission Systems*, pp. 200–201, 1972.

Primary Examiner—John W. Caldwell, Sr.
Assistant Examiner—Tyrone Queen
Attorney, Agent, or Firm—Polster, Polster and Lucchesi

[57] ABSTRACT

A method and apparatus for transmitting intelligence over a carrier wave are provided in which a signal wave form is indirectly added to a carrier wave to produce a composite wave having a recognizable pattern of variations in intervals that are defined by preselected locations in the composite wave. The pattern of variations in intervals resulting from the addition of the signal wave form to the carrier wave represents at least a portion of the intelligence to be transmitted over the carrier wave. The variations in intervals defined by the preselected locations in the carrier wave are detected and the detected interval variations are converted into a signal which has a characteristic that is a function of the recognizable pattern of interval variations. In the preferred embodiment, the intelligence is transmitted over an electric power distribution network utilizing the alternating voltage thereon as the carrier wave. By indirectly adding the signal wave form to the carrier wave, a simplified modulation system and method is provided which can be adjusted to control the amplitude of the signal wave.

21 Claims, 8 Drawing Figures

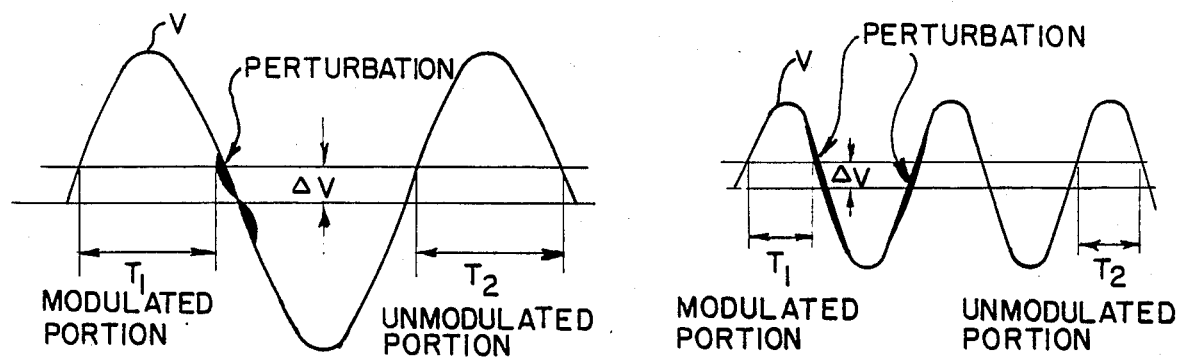
FIG.1B.
FIG 1A. PRIOR ART
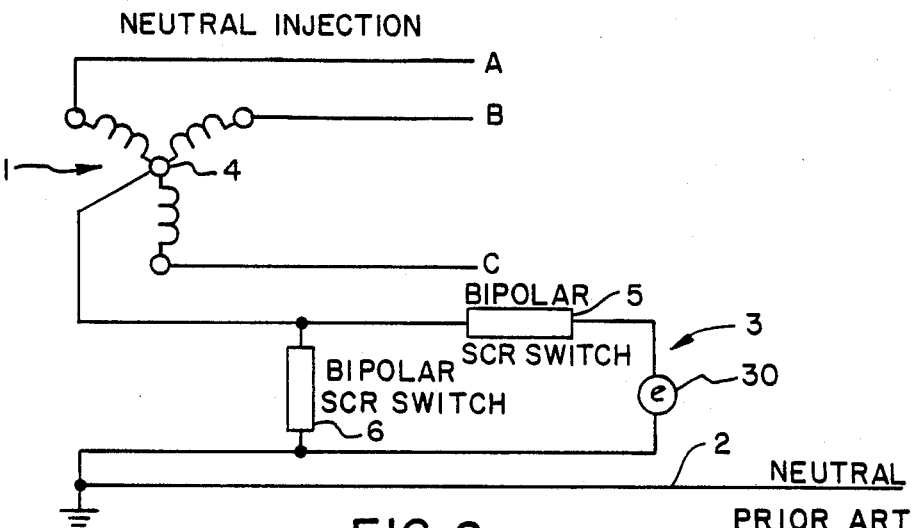
FIG.2. PRIOR ART
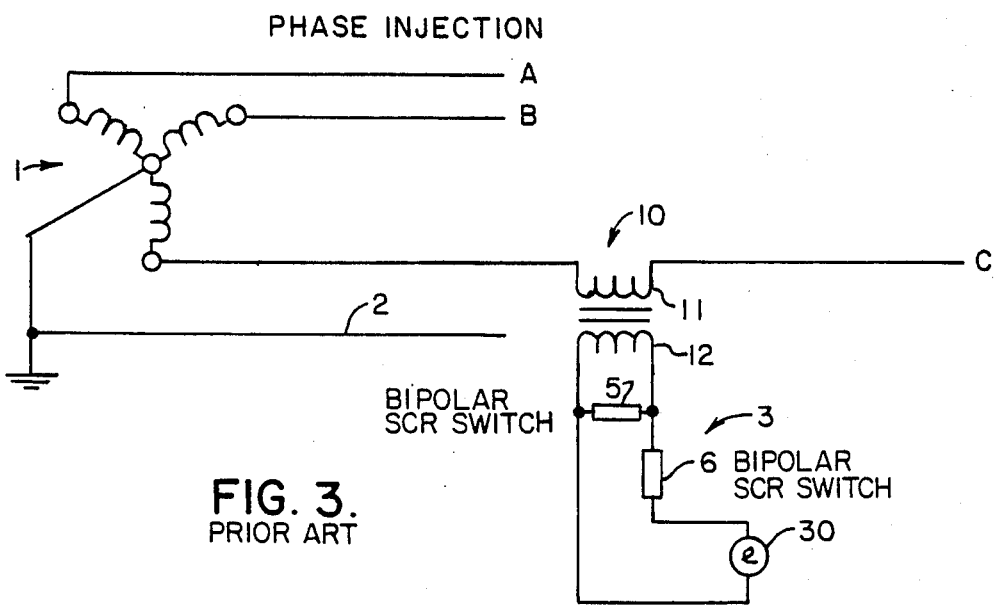
FIG.3. PRIOR ART

METHOD AND APPARATUS FOR PROVIDING SELECTIVELY VARIABLE MODULATION SIGNAL FOR A CARRIER WAVE

BACKGROUND OF THE INVENTION

This invention relates to a system for indirectly injecting intelligence on a carrier wave and relates generally to the method and apparatus described in U.S. Pat. Nos. 4,106,007 and 4,218,655, the disclosures of which are incorporated herein by reference. As described in those patents, it is known that a modulation voltage can be superimposed on a power system voltage, for example, at specified locations on the power system voltage to cause wave shape perturbations in the carrier wave. In the embodiment described hereinafter, the carrier wave is the voltage wave of an electrical power distribution system. Those skilled in the art will recognize the wider applicability of the inventive principles disclosed hereinafter. An example of such perturbation is shown in FIG. 1A of the drawings, labelled "prior art". The perturbation caused by the injected voltage is such that a time interval along successive cycles of the carrier wave can be altered. That is to say, with reference to FIG. 1, $T_1$ does not equal $T_2$ when measured at a certain threshold voltage defined as $\Delta V$. A desired signal is defined in the above-referenced patents as $|\tau| = |T_1 - T_2.|$ Several methods have been used in the past to generate the modulation voltage. The technology employed in the above-referenced patents is to insert the modulation voltage directly in series with the source voltage to obtain the desired perturbations on the bus voltage of the distribution system. For ease of signal detection at a receiving point, the threshold voltage $\Delta V$ should be kept low. This implies that the peaks of the modulation voltage should be in the vicinity of the zero crossing of the power system voltage. Typically, one full cycle of a.c. modulation voltage is injected at the neutral of a four-wire system, and such a modulation scheme is shown in FIG. 2, where it is labelled as "prior art". In the three-phase, four-wire neutral grounded system shown in FIG. 2, the modulation voltage is injected between the neutral point of the power transformer and the grounding point. Under normal operating conditions, the modulation circuit carries only the zero sequence current of the system due to system unbalance. Even in the system of FIG. 2, however, line-to-ground faults produce very high zero sequence fault current components. Because the modulation voltage is inserted directly onto the distribution line, the modulator circuit must be designed to withstand the occurrence of high current surges. In addition, the modulation voltage has a zero sequence nature and line-to-line voltages are not modulated. An advantage of the system just described is that the modulator circuit is close to ground potential so current surge protection can be accomplished in a number of known ways. While current surge protection is expensive, it is less expensive with neutral injection techniques than with other previously applied signalling methods. This type of modulation is known in the art as "neutral injection".

In order to reach line-to-line customers on the distribution network of a utility, for example, on three-phase systems, the modulation signal preferably should have dominant positive and negative sequence components. This implies that the modulation signal should not appear on all three phases simultaneously at equal strength and phase relationship. In order to obtain the desired signal for such line-to-line customers, a system of "phase injection" is used. A typical system for phase injection is shown in FIG. 3 and labelled as "prior art". In this technique, the modulation signals are injected in series with the source voltage of only one phase. In most standard three-phase transformers, the signal voltage is injected into the outgoing lead of one phase winding by means of a coupling transformer. Since the coupling transformer carries the full bus current, it must be designed so that at fault conditions, it can handle the phase fault current. While this type of transformer design is expensive, the use of a coupling transformer provides isolation between the modulation circuit and the high voltage on the bus.

Direct neutral and phase injection techniques require that a portion of the modulation circuit be inserted directly in the path of the power flow during both normal and abnormal conditions experienced on the distribution system. Consequently, these techniques require relatively expensive components for the modulation circuit. This is particularly true for neutral injection systems where fault currents can be extremely high and for phase injection systems operating at high distribution voltages where even the normal load currents are very high.

While both phase and neutral injection systems work well for their intended purpose, they have proved to be at a cost disadvantage with other known types of power distribution communication systems because of their inherent higher cost. The invention described hereinafter permits utilization of the advantages of a power wave carrier distribution system at a significantly lower cost by utilizing indirect injection of the modulation voltage. In addition, because indirect insertion is employed, a number of variables that enable fine tuning of the modulation imposed on the carrier wave can be utilized. The resulting system is lower in cost and attains equal if not better, discernible intelligence transmissions on a distribution system.

One of the objects of this invention is to provide a method and apparatus for transmitting intelligence over a distribution system.

Another object of this invention is to provide a highly reliable modulation method and apparatus for inserting intelligence on a character wave.

Another object of this invention is to provide a low cost method and apparatus for inserting a modulation wave indirectly on a distribution system.

Another object of this invention is to provide a modulation system which incorporates a number of controllable elements for controlling at least the amplitude of a modulation wave prior to its insertion on a distribution system.

Other objects of this invention will be apparent to those skilled in the art in light of the following description and accompanying drawings.

SUMMARY OF THE INVENTION

In accordance with this invention, generally stated, a modulation source voltage and control parameters are connected in parallel between a voltage source and a load. The modulation voltage is connected to the voltage source at some predetermined time interval. The value of modulation source voltage is controllable so that a predetermined or desired value of modulation voltage can be obtained. In the preferred embodiment, a step down transformer is used to interconnect the modulation circuit to the power distribution system.

BRIEF DESCRIPTION OF THE DRAWINGS

In the drawings,

FIGS. 1A and 1B are diagrammatic views illustrating the insertion of a perturbation on a voltage source, FIG. 1A being labeled as "prior art" FIG. 1B illustrating the precise signalling technique available with the invention disclosed hereinafter;

FIG. 2 is a diagrammatic view of a neutral injection modulation system for producing the perturbation of FIG. 1A;

FIG. 3 is a diagrammatic view of a phase injection modulation system for producing the perturbation of FIG. 1A;

DESCRIPTION OF THE PREFERRED EMBODIMENT

Figure 4:
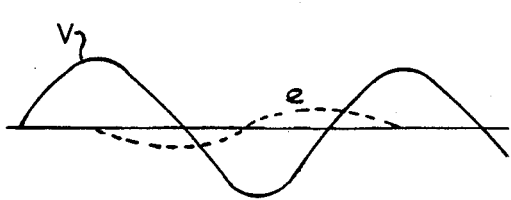
FIG. 4 is a diagrammatic view illustrating both the modulation voltage and the carrier wave which, when combined, produce the perturbation in the carrier wave as shown in FIG. 1A.

As indicated above, FIG. 1A is a view of a desired variation in the voltage wave of a electrical power distribution system, for example, which is capable of transmitting intelligence over the distribution system. The perturbation shown in FIG. 1A is obtained by the insertion of a voltage e onto the bus of the distribution system, as illustratively shown in FIG. 4. The perturbation shown in FIG. 1A is obtained by combining the two voltage waves of FIG. 4. FIGS. 2 and 3 illustrate prior art methods of obtaining the insertion voltage e. Thus, in FIG. 2, the secondary side of a wye connected transformer 1 having phases A, B and C has a modulation device 3 electrically connected between the neutral line 2 of the transformer 1 and a connection node 4 of the transformer 1. The modulation system 3 includes a voltage source 30 and a system of bipolar switches 5 and 6, respectively, which are alternately energized to control application of a voltage from the voltage source 30 to the neutral of the phases A, B and C to produce the modulation voltage e of FIG. 4 and the perturbation of the transmitted voltage wave shown in FIG. 1A.

FIG. 3 demonstrates a phase injection technique in which the transformer 1 having phases A, B and C has a secondary side 10 of a transformer 11 electrically connected in any one of the phases A, B and C of the transformer 1. A primary side 12 of the transformer 11 is connected to the voltage source 30. That connection again is made through a bipolar switching arrangement including bipolar switches 5 and 6, respectively.

While the arrangements shown in FIGS. 2 and 3 work well for their intended purposes, the inherent high cost of the components of the modulation means 3 because of the high power carrying capability required by various components interconnecting the modulation system to the distribution system limits the market potential for the systems disclosed.

Figure 5:
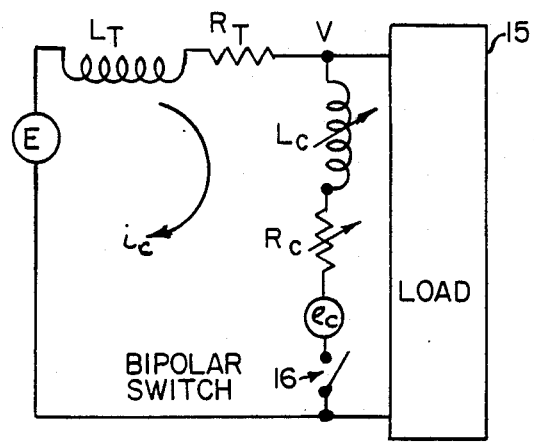
FIG. 5 is a diagrammatic view of one illustrative embodiment of device for producing indirect modulation insertion of this invention.

My method and an illustrative embodiment of a device for producing the modulation voltage required to obtain a perturbation as shown in FIG. 1B is diagrammatically illustrated for a single phase in FIG. 5. As thereshown, a voltage source E represents a line-to-ground or line-to-line source voltage. $R_t$ and $L_t$ represent the source resistance and inductance parameters. The majority of the inductance and resistance represented by the parameters $L_t$ and $R_t$ are in the distribution substation transformer of an electrical utility for example. $R_c$ and $L_c$ are passive control parameters connected in series with one another and with a control voltage source $e_c$. This last mentioned series arrangement is in turn connected in parallel between the source voltage E and a load 15. $e_c$ is the control voltage which is a voltage value equal to or less than the system voltage E. $e_c$ also is displaced in phase from the system voltage E. As indicated in FIG. 5, the magnitude of e is controllable by varying the capacitance and/or inductance of the series control elements $L_c$ and $R_c$. A switch 16, preferably of a time controlled type, connects the components $L_c$, $R_c$ and control voltage $e_c$ source in parallel with the load. For the purposes of this discussion, a lagging power factor for the load is assumed and the contribution to the load current by $e_c$ when switch 16 is closed is assumed to be negligibly small. Based on these assumptions, the voltage V across the load 15 upon closing of the switch 16 is defined as:

$$V = \hat{V} \sin(\omega t + \psi_1)$$

$$E = \hat{E} \sin(\omega t + \psi_2), \text{ where } \psi_2 > \psi_1$$

$$e_c = -\hat{e}_c \sin(\omega t + \psi_2 - \phi),$$

simplifying terms, $$\hat{e}_c/\hat{E} = \eta$$

$$R = R_c + R_t$$

$$L = L_c + L_t$$

then $$E - e_c = i_c R + L(di_c/dt)$$

The solution to the last differential equation is:

$$i_c = i_{sc} \left[ \sin(\omega t + \psi_2 + \alpha - \beta) - \sin(\psi_2 + \alpha - \beta) e^{-\frac{R}{L}t} \right],$$

where $0 \leq t \leq t_g$, where $$\alpha = \arctan \frac{\omega L}{R}$$

$$\beta = \arctan \left[ \frac{\eta \cos \phi}{1 + \eta \cos \phi} \right]$$

$$i_{sc} = \hat{E} \sqrt{\frac{1 + \eta^2 + 2\eta \cos \phi}{R^2 + (\omega L)^2}}$$

During modulation, $$V = E - (i_1 + i_c)R_t - L_t(d/dt)(i_1 + i_c),$$

where $o \leq t \leq t_g$. Without modulation, $$V = E - i_1 R_t - L_t(d/dt)(i_L)$$

The modulation signal e inserted on the distribution bus then is the difference of the above expressions.

$$e = i_c R_t + L_t(di_c/dt)$$

Since $R_t$ is usually very small, $$e = L_t(di_c/dt)$$

Figure 6:
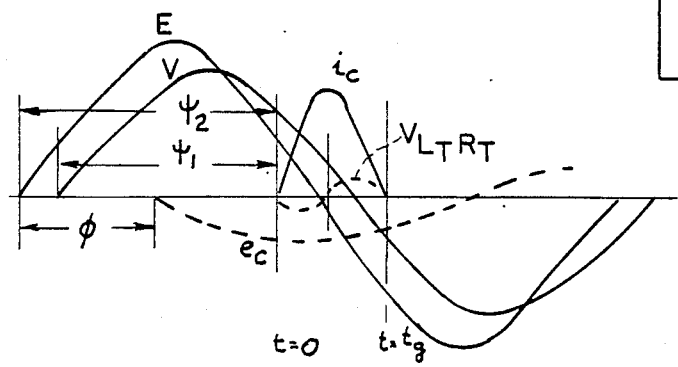
FIG. 6 is a diagrammatic view illustrating the control variables available with the modulation system of FIG. 5 for producing a desired modulation voltage to obtain the perturbation on a voltage source shown in FIG. 1B.

This modulation signal also is in series with the source voltage. By adjusting $L_c$ and $R_c$, $e_c$, t and $t_g i_c$ can be controlled to give the desired value of the modulation signal. This is an important feature of my invention, in that I have found that the reliability of the intelligence transmitted over the distribution system can be improved by the ability to tune the modulation signal to its perturbation application. Various parameters discussed above are shown in FIG. 6. As thereshown, there is a voltage $e_c$, which corresponds to the voltage applied by the closing of the switch 16, shown, for example, in FIG. 5. The voltage $e_c$ is shown in a dash line. The application of voltage $e_c$ to the inductive and resistive components $L_t R_t$ respectively develops a voltage $V_{LtRt}$, also shown as a dash line. The applied voltage $V_{LtRt}$ combines with the voltage E to provide the improved signalling capabilities of this invention. The combination of voltages E and $e_c$ produces the perturbation or signal on the voltage wave shown in FIG. 1B. The combination of the control signal wave e with the voltage wave of the bus of the distribution system gives the perturbation in the voltage wave shown in FIG. 1B.

Figure 7:
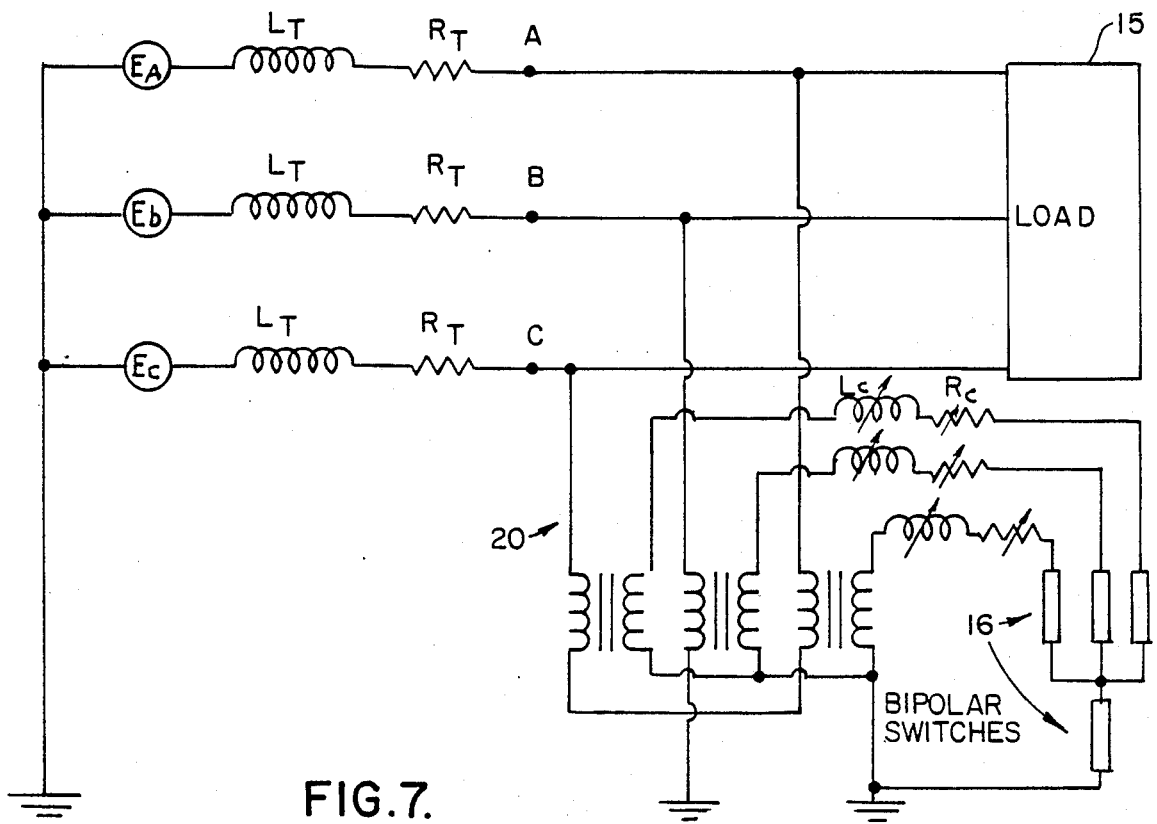
FIG. 7 is a diagrammatic view of a modulation system for a three-phase distribution system designed in accordance with the principles of this invention.

To provide isolation from the bus voltage, a stepdown transformer is used in three-phase applications. The stepdown transformer parameters become part of $R_c$ and $L_c$. A full, three-phase system is shown in FIG. 7. As thereshown, the phases A, B and C of a wye connected transformer are connected in parallel with a modulation system 20. For simplification's sake, the modulation system for each phase of the system shown in FIG. 7 is directly comparable to the single phase embodiment shown in FIG. 5, and the embodiment of FIG. 7 is not described in detail. The switch 16 in the embodiment of FIG. 7 is a series of bipolar switches which are predeterminedly controlled for proper insertion of the modulation voltage on the carrier wave.

Numerous variations, within the scope of the appended claims, will be apparent to those skilled in the art in light of the foregoing description and accompanying drawings. Thus, while the system of this invention has been described as signalling from source to load, a similar arrangement may be employed to permit signalling from load to source to provide a two way communication system, if desired. While certain components and devices were described as preferred, other components or equivalents for those described may be employed in other embodiments of this invention. While illustratively wye connected transformers have been employed, those skilled in the art will recognize that the techniques and modulation system described above can be employed with equal facility in delta connected transformer systems. An advantage of the indirect phase modulation described herein is that the modulation signal is not lost in a distribution system that progresses from a wye connected to a delta connected distribution system. While the system and method are described in conjunction with an electrical power distribution system, the insertion discussed herein is adaptable to a wide variety of distribution systems, as those skilled in the art will appreciate. These variations are merely illustrative.

Having thus described the invention, what is claimed and desired to be secured by Letters Patent is:

1. A method of transmitting digital intelligence over a power line having a preexisting alternating wave thereon, said method comprising:
   combining a signal wave with said preexisting wave on the power line to produce a composite wave having a recognizable pattern of variation in the durations of the intervals defined by preselected locations in the composite wave, said pattern of variations in the durations of the intervals representing at least a portion of the digital intelligence to be transmitted; and
   adjusting the signal wave prior to its combination with the preexisting alternating wave on the power line to any one of a variety of preselected desired amplitudes.

2. The method of claim 1 wherein said signal wave is combined with said preexisting alternating wave on the power line by adding the signal wave to the preexisting alternating wave.

3. The method of claim 1 wherein said signal wave is combined with said preexisting alternating wave on the power line by subtracting the signal wave from the preexisting alternating wave.

4. The method of claim 1 wherein said signal wave is combined with the preexisting alternating wave on the power line by superimposing the signal wave and the preexisting alternating wave.

5. The method of claim 1 including the steps of selecting said preselected locations in the composite wave with respect to the zero crossings of the composite wave.

6. In a sixty cycle transmission system having a preexisting wave transmitted thereon between a source of electrical energy and a load, the improvement comprising means for coupling a signal wave with the preexisting power wave, said coupling means including modulator means connected in parallel with said source of electrical energy and said load, said modulator means including means for generating said signal wave, means for adjusting the amplitude of said signal wave in real time operatively connected to said generating means, and means for combining said signal wave with said preexisting wave based on the zero crossings of said preexisting wave.

7. The improvement of claim 6 wherein said modulator means further includes switch means for connecting said generating means to said transmission system.

8. The improvement of claim 7 wherein said modulator means is operatively connected to said transmission system through an isolation device.

9. The improvement of claim 8 wherein said isolation device is a stepdown transformer.

10. The improvement of claim 9 wherein said transmission system is a three-phase system, and said modulation means is operatively connected to each phase thereof.

11. The improvement of claim 6 wherein said coupling means combines said signal wave with said preexisting power wave by adding the signal wave to the preexisting power wave.

12. The improvement of claim 6 wherein said coupling means combines said signal wave with said preexisting power wave by subtracting the signal wave from said preexisting power wave.

13. The improvement of claim 6 further including means for selectively interconnecting said modulator means in parallel between said source and said load.

14. A modulator means for generating a signal wave for a distribution system, which is coupled to a preexisting electrical wave on the distribution system, comprising:
   means for generating said signal wave;
   means for adjusting the amplitude of said signal wave operatively connected to said generating means; and
   means for selectively connecting said generating means to said distribution system based on the zero crossings of said preexisting wave.

15. The modulator of claim 14 further including isolation means for operatively connecting said modulator means to said transmission system.

16. The modulator means of claim 15 wherein said isolation device is a transformer.

17. An apparatus for digitally transmitting intelligence over a carrier wave which performs a predetermined function, said apparatus comprising:
   means for generating a signal wave;
   means for adjusting the amplitude of said signal wave to any one of a variety of preselected desired amplitudes in real time; and
   means for combining the signal wave with the carrier wave to produce a composite wave having a recognizable pattern of variations in the durations of the intervals defined by preselected locations in the composite wave while the carrier wave is performing the predetermined function of the carrier wave, said pattern of variations in the durations of the intervals representing at least a portion of the digital intelligence to be transmitted.

18. The apparatus of claim 17 wherein said adjustment means includes at least one reactance element.

19. The apparatus of claim 17 wherein said signal wave generating means is connectable from said transmission system by a time variable switch.

20. The apparatus of claim 19 wherein said signal wave generating means is operatively connected to said distribution system through an isolation device.

21. The apparatus of claim 20 wherein said isolation device is a transformer.

* * * * *